(12) United States Patent
Almkvist et al.

(10) Patent No.: US 9,964,028 B2
(45) Date of Patent: May 8, 2018

(54) TURBOCHARGER SYSTEM

(71) Applicant: VOLVO CAR CORPORATION, Gothenburg (SE)

(72) Inventors: Goran Almkvist, Lerum (SE); Jonas Bjorkholtz, Karna (SE); Stefan Brygard, Gothenburg (SE)

(73) Assignee: VOLVO CAR CORPORATION (SE)

( * ) Notice: Subject to any disclaimer, the term of this patent is extended or adjusted under 35 U.S.C. 154(b) by 142 days.

(21) Appl. No.: 15/150,652

(22) Filed: May 10, 2016

(65) Prior Publication Data

US 2016/0341115 A1 Nov. 24, 2016

(30) Foreign Application Priority Data

May 20, 2015 (EP) ..................................... 15168313

(51) Int. Cl.
| | | |
|---|---|---|
| *F02D 23/00* | (2006.01) | |
| *F02B 37/20* | (2006.01) | |
| *F02D 41/10* | (2006.01) | |
| *F02B 21/00* | (2006.01) | |
| *F02B 37/02* | (2006.01) | |
| *F02B 37/10* | (2006.01) | |
| *F02D 41/00* | (2006.01) | |
| *F28F 1/24* | (2006.01) | |

(52) U.S. Cl.
CPC .............. *F02B 37/20* (2013.01); *F02B 21/00* (2013.01); *F02B 37/02* (2013.01); *F02B 37/10* (2013.01);

(Continued)

(58) Field of Classification Search
CPC ........ F01N 13/082; F02B 21/00; F02B 37/02; F02B 37/20

(Continued)

(56) References Cited

U.S. PATENT DOCUMENTS 6,314,734 B1 * 11/2001 Enander ................. B60T 17/02
60/602
8,793,999 B2 * 8/2014 Rebhan ................... F02B 21/00
60/605.1

(Continued)

FOREIGN PATENT DOCUMENTS

DE 102009045380 A1 4/2011
DE 102010053057 A1 6/2012

(Continued)

OTHER PUBLICATIONS

Extended European Search Report dated Nov. 30, 2015, Application No. 15168313.3—1606, Applicant Volvo Car Corporation, 7 Pages.

*Primary Examiner* — Ngoc T Nguyen

(74) *Attorney, Agent, or Firm* — Brooks Kushman P.C.

(57) ABSTRACT

A turbocharger system for a light or heavy duty vehicle, a maritime vehicle or a construction vehicle comprises a turbocharger device, an exhaust manifold conduit, a valve, a receptacle for compressed gas and a gas compressor for compressing gas. By opening the valve during a predetermined pulse duration time period, compressed gas may be provided from the receptacle to the exhaust manifold conduit for initial turbocharger compressor spin-up. The turbocharger system further comprises a cooling means configured to decrease temperature of compressed gas provided by the gas compressor, and a heating means configured to increase temperature of the gas pulse generated by opening of the valve. By decreasing the temperature of the compressed gas in the receptacle upstream of the valve and subsequently heating up the generated air pulse before being provided to the exhaust manifold conduit, the response time of the turbocharger device can be improved.

17 Claims, 3 Drawing Sheets

(52) U.S. Cl.
CPC ......... *F02D 41/0007* (2013.01); *F02D 41/10* (2013.01); *F28F 1/24* (2013.01); *Y02T 10/144* (2013.01)

(58) Field of Classification Search
USPC .......................................................... 60/602
See application file for complete search history.

(56) References Cited

U.S. PATENT DOCUMENTS

| | | | | |
|---|---|---|---|---|
| 9,322,322 | B2 * | 4/2016 | Almkvist | ................ F02B 37/02 |
| 2009/0265074 | A1 * | 10/2009 | Heinrich | ............... G01M 3/025 |
| | | | | 701/102 |
| 2011/0288715 | A1 * | 11/2011 | Schaffeld | ................ F02B 21/00 |
| | | | | 701/31.4 |
| 2012/0260654 | A1 | 10/2012 | Proepper | |
| 2014/0230417 | A1 * | 8/2014 | Han | .......................... F01N 3/32 |
| | | | | 60/307 |
| 2016/0222874 | A1 * | 8/2016 | Almkvist | .............. F02B 37/025 |
| 2017/0335805 | A1 * | 11/2017 | Zhang | ...................... F01P 3/20 |

FOREIGN PATENT DOCUMENTS

| | | | | |
|---|---|---|---|---|
| EP | | 0531277 A3 | 8/1992 | |
| EP | | 0531277 A2 | 3/1993 | |
| EP | | 2063097 A1 | 5/2009 | |
| EP | | 2749751 A1 | 7/2014 | |
| WO | WO 2012170001 A1 * | 12/2012 | ............. F01N 3/323 |

* cited by examiner

TURBOCHARGER SYSTEM

CROSS-REFERENCE TO RELATED APPLICATIONS

This application claims foreign priority benefits under 35 U.S.C. § 119(a)-(d) to European patent application number EP 15168313.3, filed May 20, 2015, which is incorporated by reference in its entirety.

TECHNICAL FIELD

The present disclosure relates to an improved turbocharger system and an engine system comprising an improved turbocharger system. Although the disclosure will be described with respect to a passenger vehicle the disclosure is also suitable to be applied in e.g., light and heavy duty vehicles, in maritime vehicles and in construction vehicles.

BACKGROUND

In vehicles of today it is common to use an exhaust driven turbocharger for compressing air to an inlet manifold of an internal combustion engine (hereinafter simply referred to as engine). The up-speeding of the turbocharger is dependent on the exhaust flow, which in turn is dependent on engine speed and engine torque. Hence, turbocharger response is a well-known problem with turbocharger engines at low engine speeds. The response problem becomes even more imminent with the new technologies to reduce $CO_2$ where turbochargers are used to down-speed and/or downsize engines due to the fact that more energy to build up the higher boost pressure is needed. The response problem is a limiting factor in the pursue for $CO_2$ reduction, also because of that in order to provide an acceptable drivability of a vehicle a certain power margin to handle instant power demands without the need of shifting gear is required. Such instant power demand may be due to e.g., increased road inclination or driver requested acceleration.

It is known to use various compressors, such as e.g., mechanical compressors or electric compressors, connected to the inlet manifold in order to improve the turbocharger response by feeding air to the inlet side before the turbocharger has speeded up. Using of mechanical compressors adds complexity, adds cost, may impair the durability, has negative impact on the NVH (Noise, Vibrations, Harshness) properties and may be difficult to control. Using of an electric compressor also has major drawbacks e.g., due to complexity, cost and the fact that the electric compressor needs to be provided with electrical power.

EP 2749751 A1 discloses an improved turbocharger system wherein a tank, recharged by use of e.g., a compressor for compressing a gas such as air into the tank, is used to push compressed gas into an exhaust manifold conduit or an exhaust manifold during a predetermined pulse duration time period in order to obtain initial turbocharger compressor spin-up. However, in order for the improved turbocharger disclosed in EP 2749751 A1 to utilize its full potential further improvements and optimizations are needed.

Thus, there is still a need and room for further improvements.

SUMMARY

An object of the present disclosure is to provide an improved turbocharger system and a system comprising the improved turbocharger system, particularly by improving the turbocharger response. The object of the present disclosure is achieved by utilizing the ideal gas physical property that the pressure of a gas is directly proportional to the temperature of the gas if the volume is constant. This physical property is utilized in a turbocharger system according to the disclosure in order to reach the object of the disclosure. Yet an object of the present disclosure is to provide a robust and cost effective turbocharger system. Further advantages of the present disclosure are achieved by the dependent claims. The present disclosure is applicable for light and heavy duty vehicles, in maritime vehicles, in construction vehicles and in industrial machines. The present disclosure also relates to a vehicle comprising the improved turbocharger system.

The delay in response time is one of the most imminent problems for turbocharged engines. There are various ways of improving the response time, wherein one advantageous ways is to add compressed gas to the exhaust manifold or exhaust manifold conduit in order to spin up the turbocharger device. There are however aspects of this approach that may be improved and it is also desirable that the system is robust and durable.

The disclosure relates to a turbocharger system for a vehicle. The turbocharger system comprises a turbocharger device, an exhaust manifold conduit, a valve, a receptacle for compressed gas and a gas compressor for compressing gas. The turbocharger device comprises a turbocharger compressor and a turbocharger turbine which are rotationally coupled to each other and are enclosed by a turbocharger housing. During operation, exhaust gas from an engine drives the turbocharger turbine such that the coupled turbocharger compressor is driven. The turbocharger compressor provides additional air to the combustion chamber of the engine wherein more power can be produced and the engine can be operated at a higher efficiency. The functionality of a turbocharger device is not part of the disclosure per se and is considered to be part of general knowledge.

The exhaust manifold conduit is arranged to be in fluid communication with an inlet of the turbocharger turbine of the turbocharger device. The exhaust manifold conduit is also arranged to be in fluid communication with the receptacle. The receptacle is in turn arranged to be in fluid communication with the gas compressor, which is configured to provide compressed gas to the receptacle. The valve is arranged between the exhaust manifold conduit and the receptacle and is configured to control a gas flow from the receptacle to the exhaust manifold conduit. The valve enables that by closing the valve a gas pressure may be built up in the receptacle by use of the gas compressor. By subsequently open the valve during a predetermined pulse duration time period compressed gas from the receptacle may be provided to the exhaust manifold conduit. The opening of the valve generates a gas pulse of gas from the receptacle which increases the pressure in the exhaust manifold conduit, and thereby increases the gas flow in the exhaust manifold conduit.

Providing the generated gas pulse from the receptacle to the exhaust manifold conduit, which is in fluid communication with the input of the turbocharger device, leads to additional spin-up of the turbocharger turbine and thereby initial compressor spin-up of the turbocharger compressor. This will improve the response of the turbocharger device.

The turbocharger system further comprises a cooling means and a heating means. The cooling means is arranged between the gas compressor and the valve, thus where the receptacle is arranged, or at the gas compressor, and is configured to decrease the temperature of, or cool down, the compressed gas provided by the gas compressor. The heating means is arranged between the valve and the inlet of the turbocharger turbine, e.g., to the exhaust manifold conduit. The heating means is configured to increase the temperature of, or heat up, the compressed gas before being provided to the inlet of the turbocharger turbine and is arranged between the valve and the inlet of the turbocharger turbine.

There are many different ways in which the heating means and the cooling means may be provided, of which a few will be disclosed throughout the description. The heating means may e.g., be provided by that the compressed gas is mixed with hot, recirculated exhaust gas before being provided to the exhaust manifold conduit or other suitable position between the valve and the inlet of the turbocharger turbine, be provided by that the gas is fed through a heat conductive conduit arranged between the valve and the exhaust manifold conduit, which is heated by being exposed to the hot exhaust manifold, or be provided by that a portion of the exhaust manifold conduit is heated.

The amount of gas the gas compressor is able to provide to the receptacle is limited by the pressure the valve and the receptacle are designed to withstand and the capability of the gas compressor, meaning the compression rate and the compression pressure capability of the gas compressor. Thus, recharge time and the maximum amount of compressed gas in the receptacle is limited by the gas pressure.

The purpose of the cooling means is to cool down or lower the temperature of the compressed gas provided by the gas compressor to the receptacle. The configuration of the cooling means, the compression rate of the gas and the type of gas used to feed the compressor determines the lowering of temperature of the gas. Compression of a gas increases the temperature of the gas, something which often is referred to as the heat of compression. Thus, irrespectively of which gas that is fed to the compressor (as long as this gas is not considerably colder than the temperature of ambient air) the temperature of the compressed gas may be lowered by e.g., using a finned heat exchanger as cooling means through which the compressed gas is fed. According to one aspect of the present disclosure ambient air is fed to the gas compressor and subsequently, after the temperature of the air has been increased during the compression, the temperature of the compressed gas is lowered back to the temperature of ambient air. However, if hot exhaust gas is used as gas fed to the compressor the lowering of temperature of the compressed gas may be larger. The higher the temperature of the compressed gas is, and the more efficient the cooling means is, the larger is the potential decrease of temperature of the compressed gas. By decreasing the temperature of the compressed gas provided to the receptacle the gas pressure provided by the compressed gas will be reduced. This has the effect that more gas may be provided to the receptacle by the gas compressor during a shorter recharge time.

Subsequently, by opening the valve during a predetermined time period duration and thereby generating an air pulse, and compressed gas is provided from the receptacle directly or indirectly to the exhaust manifold conduit via the heating means. According to the present disclosure the heating means are provided between the valve and the exhaust manifold conduit. The purpose of the heating means is to increase the temperature of, or heat up, the generated gas pulse.

The injection of the generated gas pulse will increase the gas pressure in the exhaust manifold conduit, but by also increasing the temperature the generated gas pulse the gas will expand and the increase in gas pressure will be even larger. Increasing the gas pressure in the exhaust manifold conduit has the effect that the turbocharger turbine of the turbocharger device will be up-speeded even more than by only generating a gas pulse.

Thus, by first using cooling means to lower the temperature of the compressed gas, and after opening the valve during a predetermined time period duration in order to generate a gas pulse, subsequently increasing the temperature of the gas by using heating means, the effect of adding compressed gas in order to spin-up the turbocharger compressor and thereby improve the response of the turbocharger device, will be significantly enhanced. This facilitates that a smaller receptacle can be used that would be possible without applying the cooling and heating of the gas used to generate the gas pulse.

Depending on the design of the engine of the vehicle and the required cooling properties of the cooling means it may be most suitable to either arrange the cooling means at the gas compressor, e.g., by providing the gas compressor with cooling fins, or, as will be disclosed more in detail later, to at least one pipe or a tank that may be part of the receptacle. For some engine designs and cooling requirements cooling means distributed over the receptacle, a tank of the receptacle, pipes of the receptacle and/or the compressor may be the most suitable approach.

It should be noted that a small tank has the advantage of being light weight and is beneficial from a packaging perspective but needs to be refilled often. A larger tank needs to be refilled less often but may be heavy and less beneficial from a packaging perspective.

The turbocharger device of the present disclosure may be any type of known turbocharger, such as e.g., a twin scroll turbocharger, a variable nozzle turbine turbocharger or a dual stage turbocharger. According to an aspect of the present disclosure the compressed gas is preferably ambient air fed to the compressor via a gas supplying means in form of an air filter. According to another aspect the compressed gas is exhaust gas. If exhaust gas is used as compressed gas the exhaust gas is preferably taken out downstream of the particulate filter in order to avoid fouling of the turbocharger components.

For other aspects where exhaust gas is used, but where the exhaust gas not is taken out downstream of the particulate filter, the feeding of exhaust gas to the receptacle may be performed during exhaust blowdown peaks. It is also possible to use boost pressure from the turbocharger device as gas fed to the gas compressor. Herein the compressed gas, preferably air, exhaust gas or gas from the boosted air from the turbocharger, will only be referred to as compressed gas. It is also possible to use either exhaust gas or boost pressure to drive the gas compressor. The compressor may also be driven by electricity or other suitable means.

According to one aspect of the present disclosure a system for a vehicle comprising the previously disclosed turbocharger system and an exhaust manifold is provided. The exhaust manifold is configured to be in fluid communication with the exhaust manifold conduit and with the receptacle. According to this aspect of the present disclosure the valve and the receptacle are arranged to provide compressed gas into the exhaust manifold during a predetermined pulse duration time period for initial spin-up of the turbocharger turbine and thereby of the rotationally coupled turbocharger compressor.

The exhaust manifold is connected to the exhaust manifold conduit, such that the exhaust manifold and the exhaust manifold conduit are in fluid communication, or the manifold conduit may be a part of the exhaust manifold. If the gas pulse is provided to the exhaust manifold or the exhaust manifold conduit is not decisive since the exhaust manifold and the exhaust manifold conduit is set to be in fluid communication. A gas pulse injected into the exhaust manifold will increase the gas pressure and gas flow through the exhaust manifold conduit in essentially the same way as if the gas pulse was injected directly into the exhaust manifold conduit. The gas flow path from the valve to the exhaust manifold or to the exhaust manifold conduit may also comprise at least one pipe. What is important for the present disclosure to achieve the desired effect is that by controlling the valve such that a gas pulse from the receptacle is generated, and subsequently heat up the gas pulse in order for additional effect, the pressure in the exhaust manifold conduit is increased for enhanced spin-up of the turbocharger turbine. This effect is obtained e.g., if the heated gas pulse is injected into the exhaust manifold or into the exhaust manifold conduit.

Naturally, the vehicle comprises at least one control unit controlling the functionality of the system comprising the turbocharger system and all related components such as valves and sensors. The control unit is not limited to being one single control unit. The control unit may comprise numerous interacting control units and local controllers of the vehicle. This may also be referred to as the computer of the vehicle. According to the present disclose the control unit may be connected to a separate pulse regulation unit for regulating the pulse duration time period.

According to another aspect of the present disclosure the receptacle comprises a tank and at least one tank pipe, wherein the tank and the tank pipe are in direct fluid communication with each other. The total volume of the receptacle is defined by a number of components, such as pipes and tanks, arranged between the gas compressor and the valve. The larger this volume is, thus the more compressed gas that can be stored within the receptacle, the better may the effect of adding compressed gas to the exhaust manifold or exhaust manifold conduit be, and the more efficient will the effect of also cooling the compressed gas of the receptacle be.

It should be noted that according to some aspects of the present disclosure the volume of the receptacle may be essentially equal to the volume of a tank of the receptacle, meaning that the volume of possibly present pipes of the receptacle are negligible in relation to the volume of the tank. According to other aspects the volume of the pipe or pipes may be more significant in relation to the volume of the tank.

According to one aspect of the present disclosure a pipe may be provided between the valve and the tank. According to another aspect a pipe may be provided between the tank and the gas compressor. For these two aspects of the present disclosure the total volume of the receptacle is defined by the volume of the tank and the volume of respective pipe. According to a third aspect there may be a pipe both between the valve and the tank and between the tank and the gas compressor. The utilization of at least one pipe may facilitate the packaging of the engine components, including e.g., the tank, the gas compressor and the turbocharger device, of the vehicle.

According to another aspect of the present disclosure the receptacle is in form of just one pipe connecting the gas compressor with the valve. For this aspect of the present disclosure the volume of the receptacle is defined by the volume of the pipe. This aspect of the present disclosure has the advantage that no tank, providing additional weight and packaging limitations, needs to be considered.

According to one further aspect of the present disclosure the cooling means comprises a pipe of the receptacle, wherein the pipe is arranged between the gas compressor and the tank of the receptacle. For this aspect of the present disclosure the compressed gas provided by the gas compressor is cooled down before being provided to the tank of the receptacle. Cooling down the compressed gas before the gas is provided to the receptacle is an efficient way, and an advantageous way from a design perspective, in order to provide the desired decrease in temperature of the compressed gas. E.g., according to one example of such an aspect of the present disclosure the cooling means may be in form of a finned heat exchanger. The finned heat exchanger may comprise a conduit, forming the pipe of the receptacle connecting the gas compressor and the tank, which is provided with cooling flanges extending from the conduit in a direction essentially perpendicular to the direction of the conduit.

The direction and extension of the cooling flanges may be configured in different ways depending on what is most efficient for the specific implementation. What configuration that is most efficient for the implementation may e.g., be determined by what configuration that provides the best cooling and is most suitable from a packaging perspective in relation to cost and robustness.

When an internal combustion engine is operated thermal energy is developed first and foremost due to that heat is generated by the combustion process and that hot exhaust gas is generated. The combustion process and the circulation of hot exhaust gas heats up a number of engine components such as e.g., the exhaust manifold.

According aspects of the present disclosure the heating means is in form of a heat conductive conduit arranged such that at least a portion of the heat conductive conduit is guided along, and in contact with, the surface of the exhaust manifold or is in form of a heat conductive conduit arranged as at least one channel formed in the goods of exhaust manifold. Thus, the heat conductive conduit is either arranged as a conduit running in parallel to and in contact with the surface of the exhaust manifold or as one channel, or a plurality of channels, formed within the goods (e.g., body) of the exhaust manifold. The more channels that are formed in the exhaust manifold, the better will the heat transfer be since the total inner surface of the channels forming heat conductive conduits will be greater. Thereby a transfer of thermal energy, in the form of that heat may be transferred from the hot exhaust manifold to the heat conductive conduit of the heating means, is enabled. The heated heat conductive conduit may in turn heat up the generated gas pulse flowing through the conduit.

According one aspect of the present disclosure the heat conductive conduit may be a conduit arranged to the outside of the exhaust manifold such that heat from the exhaust manifold heats up the heat conductive conduit, and thereby the generated gas pulse flowing through the conduit. At least a portion of the heat conductive conduit may e.g., be guided over the surface of exhaust manifold. According to another aspect of the present disclosure the heat conductive conduit may be a conduit formed as a channel, e.g., drilled or formed during moulding of the exhaust manifold, in the goods of the exhaust manifold, wherein heat from the exhaust manifold will heat the generated gas pulse flowing through the formed conduit.

According to aspects of the present disclosure an important property of the heating means is that the thermal energy used to increase the temperature of the gas of the generated gas pulse is derived from hot engine components, such as e.g., the goods of the exhaust manifold or hot exhaust gas recirculation (EGR) pipes. The increase in temperature of the gas of the generated gas pulse should not be due to mixing of colder, previously compressed gas and hot exhaust gas. Thus, for aspects of the present disclosure it is important that the generated gas pulse is heated by the heating means, e.g., by being conducted in a heat conductive conduit at or in the hot exhaust manifold, before being injected to the exhaust manifold or exhaust manifold conduit.

According to one implementation of the present disclosure the heating means is in form of that the generated gas pulse, preferably being an air gas pulse, is mixed in an exhaust gas recirculation system (EGR), before being injected to the exhaust manifold or exhaust manifold conduit. Mixing in the EGR system increases the temperature of the gas pulse, thus increased the gas pressure provided by the generated gas pulse. For this aspect of the present disclosure the thermal energy used to increase the temperature of the injected gas is provided by the hot EGR pipes, which continuously are heated due to their exposure to hot, recirculated exhaust gas.

Using of dual sheet manifolds, meaning manifolds that are moulded to be at least partly hollow, where at least a part of the manifold has been drilled out or like, are advantageous due to their low weight. According to still another aspect of the present disclosure, wherein the exhaust manifold of the vehicle is a dual sheet manifold, the heating means is provided by that the generated gas pulse is allowed to flow through cavities of said dual sheet manifold. The dual sheet manifold may comprise cavities forming a channel within the hot exhaust manifold. By letting the generated gas pulse flow through said channel before entering the exhaust manifold or exhaust manifold conduit the generated gas pulse may be efficiently heated. This is a space and cost efficient way of providing a heating means for vehicles with a dual sheet manifold.

Both decreasing the temperature of the gas and increasing the pressure of the gas promotes the formation of condensate. Thus, if the compressed gas contains any moisture, during compression of the gas by the gas compressor and decreasing of the temperature of the gas by the cooling means, there is an imminent risk that condensate will be formed. E.g., ambient air generally contains moisture as well as exhaust gas which contains moisture as a result from the chemical reactions taking place during the combustion of fuel.

According to one aspect of the present disclosure a pipe of the receptacle is arranged between the gas compressor and the tank of the receptacle, wherein the pipe provides the gas compressor and the tank to be in fluid communication with each other. The pipe comprises a first end of the pipe which is arranged to the gas compressor and a second end, wherein the second end of the pipe is provided at an opposite end of the pipe than the first end, which is arranged to the tank. Further, the pipe may be provided at an inclined angle in relation to a longitudinal direction of the vehicle wherein the first end is elevated in relation to the second end such that condensate formed in the pipe and/or in the compressor is discharged to the tank.

Correspondingly, according to another aspect of the present disclosure the tank is provided with a drainage pipe. The drainage pipe is arranged at a lower portion of the tank, preferably at or near the lowest part of the tank, such that any condensate formed in the tank may be collected at this lower portion of the tank and may be discharged from the tank through the drainage pipe. Also condensate formed in the gas compressor or in a pipe connecting the gas compressor with the tank discharged to the tank may be collected at the lower portion of the tank and subsequently discharged from the tank.

Together with the discharged condensate also precipitated dirt may be removed. Discharging condensate and precipitated dirt is advantages from a durability perspective. Also, the use of a drainage pipe removes the need of adding a dehumidifier to the system.

According to one aspect of the present disclosure the receptacle, possibly comprising a tank and/or at least one pipe, is made of metal, such as e.g., aluminium or stainless steel, in order to withstand corrosion caused by formed condensate. The inside surface of the receptacle may also be surface treated in order to withstand corrosion.

According to different aspects of the present disclosure the gas compressor and the receptacle may be part of the pneumatic chassis suspension and/or air pressure brake system of the vehicle. The gas compressor may be arranged in an engine compartment.

The valve of the present disclosure may be a pulse width modulated valve. The pulse modulated valve used is preferably configured to be closed at low current and to be opened when a high current is applied. Also servo assisted valves may be used. The valve is preferably mounted as close to the heating means as possible in order to maximize the volume of the receptacle. Thus, according to aspects where heat from the exhaust manifold is used to provide the heating means the valve is preferable mounted directly to, or at least really close to, the exhaust manifold. In aspects of the present disclosure where the valve is not arranged directly to the heating means, a pipe may be arranged between the valve and the heating means.

According to one implementation of the present disclosure a system with the following parameters is valid:

A valve, wherein the valve is a valve of pulse width modulation type, is configured to have an opening response time of 25 to 100 ms (microseconds) and a closing response time of 50 to 200 ms.

The diameter of the valve is essentially 5-6 mm (millimeter).

The valve is further configured to empty approximately 90% of a receptacle within 500 ms.

A pipe of a receptacle arranged to connect a gas compressor to a tank of the receptacle, thus the gas compressor is set to be in fluid communication with the tank via a gas flow through said pipe, is configured to have an inner diameter of essentially 4 to 5 mm.

A pipe of the receptacle extending from the tank to a valve, wherein a gas flow from the tank through the said pipe is controllable by using the valve, is configured to have an inner diameter of essentially 12 to 15 mm.

The total volume of the receptacle is essentially 2.0 liters, wherein the volume of the tank of the receptacle is essentially 1.7 liters and the volume of the present pipe/pipes of the receptacle is essentially 0.3 liters.

The compressor is a 400 W electric compressor.

According to another aspect the diameter of the valve may be essentially 10-13 mm. According to yet another aspect the receptacle has a volume of 0.5 to 8 liters, preferably 1 to 2.5 liters.

The exemplifying implementation of the present disclosure has the advantage that components with the stated dimensions are working together and that such components can be obtained today at reasonable price and that they fulfill the requirements of robustness and durability.

A major advantage with the present disclosure is that it is possible to implement on any existing turbocharger system by simply adding a gas compressor, a receptacle and a valve.

The present disclosure also refers to a vehicle comprising a system according to any of the previously disclosed aspects, or any combination thereof. The present disclosure may be particularly advantageous for maritime vehicles, construction vehicles or industrial machines such as e.g., forklifts.

BRIEF DESCRIPTION OF THE DRAWINGS

Below the present disclosure is described in connection with the attached drawings, in which.

DETAILED DESCRIPTION

As required, detailed embodiments are disclosed herein; however, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
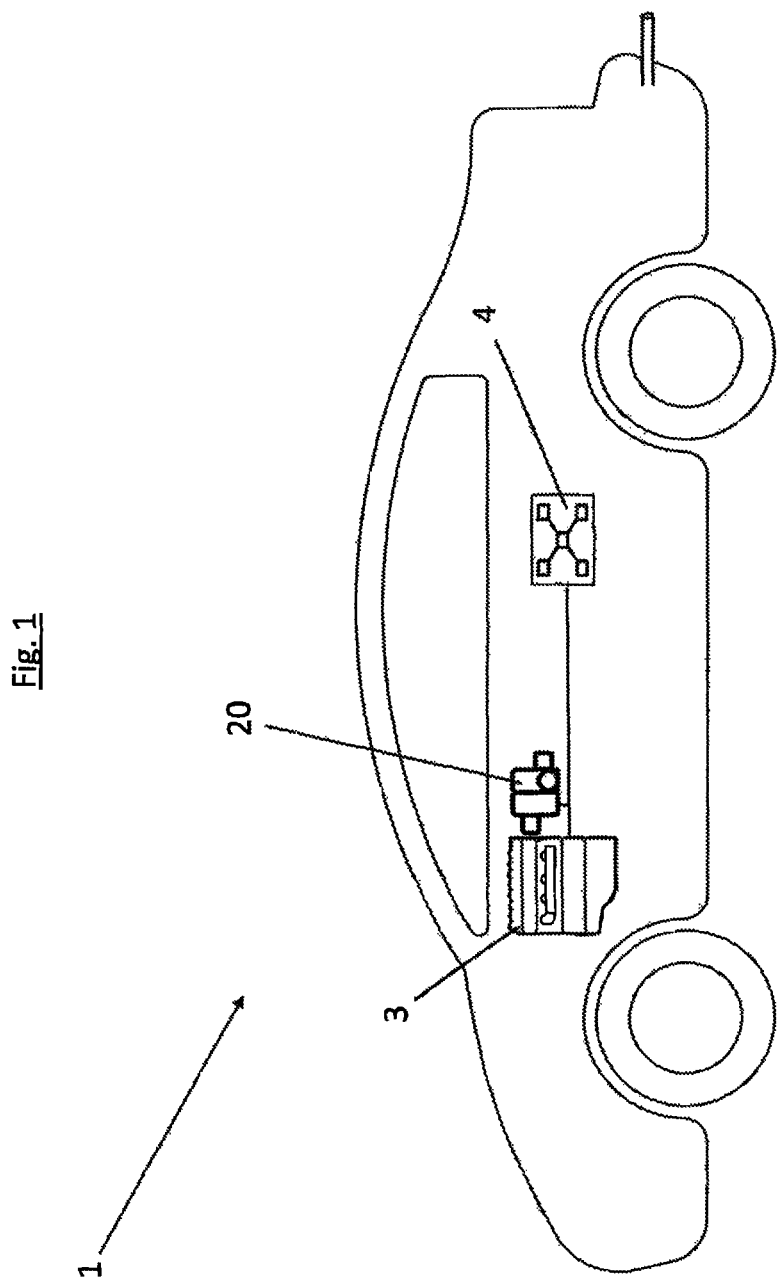
FIG. 1 schematically discloses a vehicle comprising a systems in turn comprising a turbocharger system according to one embodiment of the present disclosure.

FIG. 1 discloses a vehicle 1 comprising an engine 3, wherein the engine 3 is provided with a turbocharger 20. The engine 3 and the turbocharger 20, and other not explicitly disclosed engine components, are controlled by an engine control unit 4.

Figure 2:
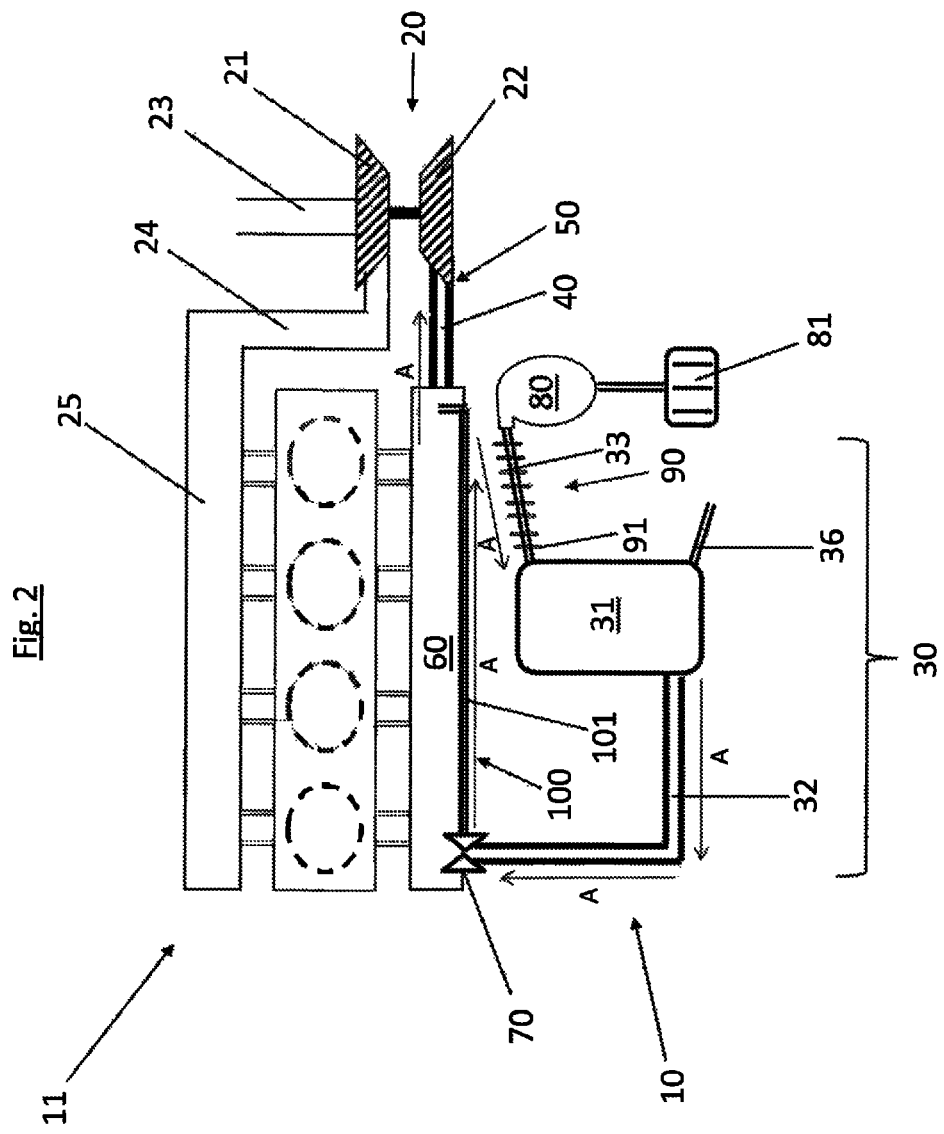
FIG. 2 schematically discloses an engine comprising a system in turn comprising a turbocharger system according to one embodiment of the present disclosure.

FIG. 2 schematically discloses a turbocharger system 10 for a vehicle 1 according to the disclosure. The turbocharger system 10 comprises a turbocharger 20, a receptacle 30 for compressed gas, a valve 70, an exhaust manifold conduit 40 and a gas compressor 80. The turbocharger system 10 is part of a system 11 also comprising an exhaust manifold 60. The turbocharger comprises a turbocharger compressor 21 and a turbocharger turbine 22.

The exhaust manifold conduit 40 is in fluid communication with a turbocharger inlet 50 of the turbocharger 20, wherein the inlet 50 is in fluid communication with the turbocharger turbine 22. The exhaust manifold conduit 40 is further in fluid communication with the exhaust manifold 60. The exhaust manifold 60 is in turn in fluid communication with the receptacle 30. The receptacle 30 is in fluid communication with the gas compressor 80.

When the gas compressor 80 is operating a gas flow is created, originating from the gas compressor 80 and possibly flowing past in order; the receptacle 30, the valve 70 (if open) the exhaust manifold 60, the exhaust manifold conduit 40 to the turbocharger 20. The gas flow is indicated by arrows A.

In the embodiment disclosed in FIG. 2 the receptacle 30 comprises a tank 31 and a first pipe 32, wherein the first pipe 32 is directly connected to be in fluid communication with the tank 31 and wherein the first pipe 32 is arranged downstream of the tank 31 in relation to a gas flow originating from the gas compressor 80 as is indicated by the arrows A.

The first pipe 32 of the receptacle 30 is in fluid communication with the exhaust manifold 60, and via the exhaust manifold 60 to the exhaust manifold conduit 40. Between the receptacle 30 and the exhaust manifold 60, which in the embodiment of FIG. 2 is between the first pipe 32 of the receptacle 30 and the exhaust manifold 60, the valve 70 is arranged. The valve 70 is configured to control a gas flow from the receptacle 30 to the exhaust manifold 60.

In the embodiment of the present disclosure shown in FIG. 2 the total enclosed volume of the receptacle 30 is formed by the volume of the tank 31 and the first pipe 32. In other, not shown embodiments of the present disclosure the receptacle may be formed by just a tank being directly connected to an exhaust manifold/exhaust manifold conduit, wherein a valve is arranged to control the gas flow between the tank of the receptacle and the exhaust manifold/exhaust manifold conduit, such that the tank and the exhaust manifold/exhaust manifold conduit is in fluid communication. For such embodiments the total enclosed volume of the receptacle is the volume of the tank. In yet further, not shown embodiments of the present disclosure the receptacle may be formed by just a pipe, wherein the pipe is fluidly connecting the gas compressor with the exhaust manifold, in the presence of a valve, wherein the total enclosed volume of the receptacle is the volume of the pipe.

The gas compressor 80 is configured to when in operation compress a suitable gas which is temporarily stored in the receptacle 30. By controlling the valve 70, which is controlling the gas flow from the receptacle 30 to the exhaust manifold 60 it is possible to generate a gas pulse by opening the valve 70 during a predetermined duration time period. By opening the valve 70 and thereby injecting a gas pulse into the exhaust manifold 60 the gas flow in the exhaust manifold 60 and thereby in the exhaust manifold conduit 40 is increased. This has the effect that the turbocharger turbine 22 will be spinned-up, increasing the rotational speed of the turbocharger turbine 22. Increasing the rotational speed of the turbocharger turbine 22 will increase the rotational speed of the rotationally coupled turbocharger compressor 21 wherein additional boosting of the engine 1 is achieved. Thus, the turbocharger system 10, or the system 11 comprising the turbocharger system 10, as disclosed in FIG. 2 may be used to improve the response of the turbocharger 20.

However, further improvements of the system 11, further reducing the turbocharger response time is possible by optimizing the system 11.

The embodiment of the turbocharger system 10, and the system comprising the turbocharger system 11, also comprises cooling means 90 and heating means 100.

The cooling means 90 of the embodiment of the present disclosure shown in FIG. 2 comprises a second pipe 33 of the receptacle 30 provided with cooling fins 91. By e.g., guiding an air flow generated when driving the vehicle 1 past the cooling fins 91 of the cooling means 90 the compressed gas provided by the gas compressor 80 flowing through the second pipe 33 to the tank 31 can be cooled down.

The heating means 100 of the embodiment of the present disclosure shown in FIG. 2 comprises that a heat conductive conduit 101 is arranged to the exhaust manifold 60. The thermal energy developed during the combustion of fuel will heat up the exhaust manifold 60, wherein the hot exhaust manifold 60 will heat up the heat conductive conduit 101 of the heating means 100. Heating of the heat conductive conduit 101 will in turn heat up the generated gas pulse flowing through the heat conductive conduit 101.

The cooling means 90 enables that the temperature of the compressed gas is decreased before being fed to the receptacle 30. This has the effect that the pressure of the compressed gas is lowered, wherein the gas compressor 80 can compress and provide more gas to be fed to the receptacle. Thus, the density of the compressed gas is increased.

The heating means 100 subsequently increases the temperature of the generated gas pulse. Increasing the temperature of a gas, such as of the generated gas pulse, will increase the gas pressure and thereby generate an increased gas flow. Thus, by increasing the temperature of the gas of the gas pulse the increase of pressure caused by the gas pulse will be even more significant.

An additional increase of the pressure in the exhaust manifold 60 increasing the gas flow through the exhaust manifold 60, and thereby in the fluidly connected exhaust manifold conduit 40, will provide additional spin-up of the turbocharger turbine 22 and thereby further improve the turbocharger 20 response.

In FIG. 2, is but one example of how a cooling means may be provided and but one example of how a heating means may be provided disclosed. Other possible ways to provide cooling means and heating means are disclosed in the description above.

FIG. 2 discloses that the system 10 comprises an exhaust manifold 60 in fluid communication with the exhaust manifold conduit 40. In FIG. 2, the tank 31 is arranged to push gas into the exhaust manifold 60 during a predetermined pulse duration time period for initial compressor spin up in the turbocharger 20. In FIG. 2 the receptacle 30 comprises a tank 31 and a first pipe 32, wherein the tank 31 is connected to and in fluid communication with the exhaust manifold 60 via the first pipe 32. The tank may however be connected directly to the exhaust manifold conduit via a pipe (not shown) or to any other part of the exhaust manifold system being in fluid communication with the turbocharger.

FIG. 2 discloses a receptacle 30 that is rechargeable by use of a gas compressor 80 for compressing gas into the receptacle 30. The compressed gas is preferably air, exhaust gas or any other suitable gas. The compressed gas is preferably supplied to the gas compressor 80 by a gas supplying means 81. If the compressed gas is air the gas supplying means 81 may be in form of an air filter or like.

FIG. 2 discloses the basic principle of a turbocharger 20, wherein the turbocharger 20 is driven by exhaust gas from an engine 3, and wherein the turbocharger compresses air from an air intake 23 into the engine 3 via an engine inlet 24 and inlet manifold 25 of the engine 3.

When the temperature of the compressed gas of the receptacle 30 is lowered and as the pressure of the receptacle 30 is increased there is an imminent risk that condensate will be formed in concerned components.

FIG. 2 further discloses that the second pipe 33 of the disclosed embodiment of the present disclosure is provided at an inclined angle in relation to a longitudinal direction of the vehicle 1. A first end 34 of the second pipe 33 is arranged to the gas compressor 80 and is elevated in relation to a second end 35 of the second pipe 33, wherein the second end 35 of the second pipe 33 is provided at an opposite end of the second pipe 33 than the first end 34. The second end 35 of the second pipe 33 is arranged to the tank 31 such that condensate formed in the second pipe 33 and/or the compressor 80 is discharged to the tank 31. The tank 31 is further provided with a drainage pipe 36, wherein condensate formed in the compressor 80, the second pipe 33 or the tank 31 may be discharged through the drainage pipe 36.

Figure 3:
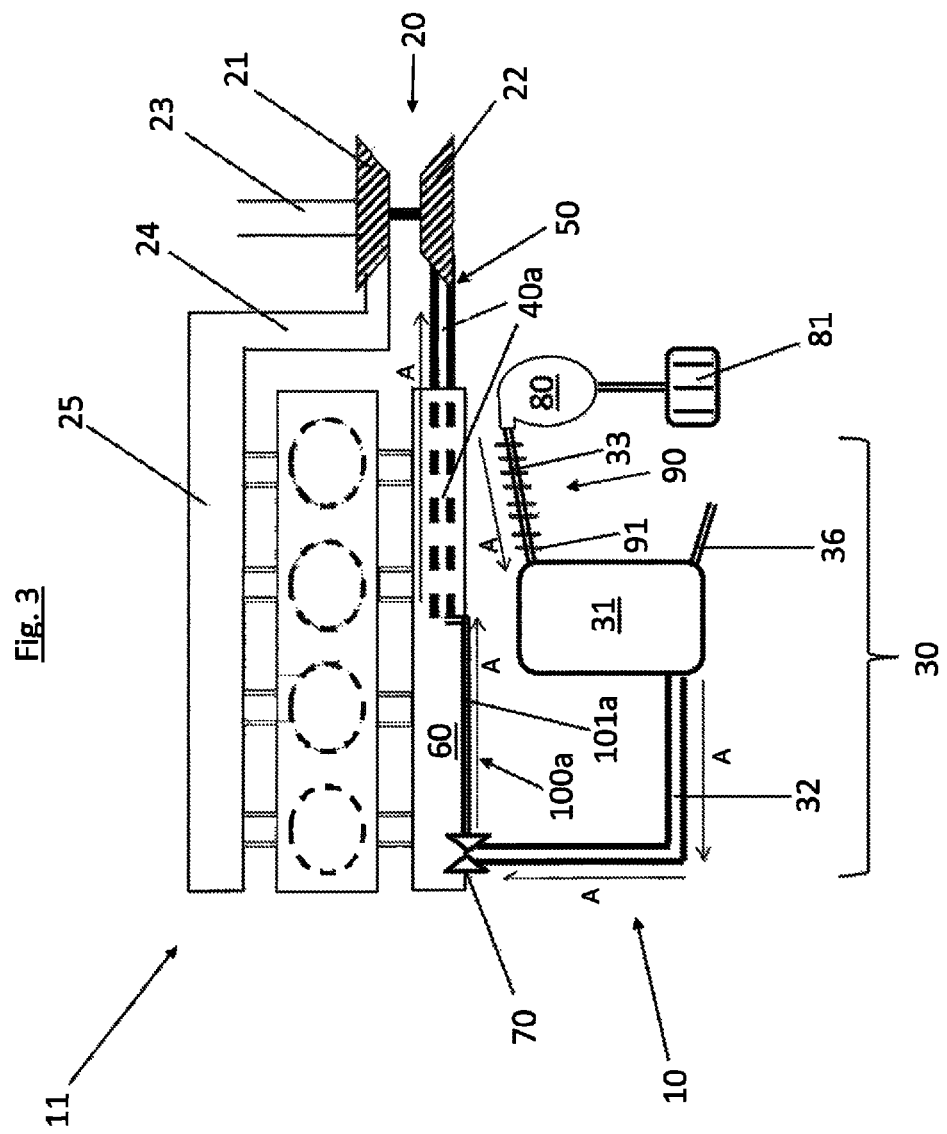
FIG. 3 schematically discloses an engine comprising a system in turn comprising a turbocharger system according to another embodiment of the present disclosure.

FIG. 3 discloses another embodiment of the present disclosure identical to the embodiment disclosed in FIG. 2 with one exception; in the embodiment shown in FIG. 3 the heating means 100a, which in the embodiment disclosed in FIG. 3 also is in form of a heat conductive conduit 101a, is shorter than the heat conductive conduit 101 of the heating means 100 of FIG. 2. Using a shorter heat conductive conduit 101a as heating means 100a may entail that the heating effect of the heating means 100a is slightly lower.

The cooling means 90 and the heating means 100, 100a disclosed in FIGS. 2 and 3 are just two examples of respective means. Other approaches, e.g., as is disclosed in the description, are possible in order to reach the desired effect of the cooling means, which is lowering the temperature of the compressed gas such that the gas pressure is reduced, and the heating means, which is to increase the temperature of the generated gas pulse such that the gas pressure is increased.

While exemplary embodiments are described above, it is not intended that these embodiments describe all possible forms according to the disclosure. The words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A turbocharger system for a vehicle, the turbocharger system comprising:
    a turbocharger device including a turbocharger compressor and a turbocharger turbine;
    an exhaust manifold conduit arranged to be in fluid communication with an inlet of the turbocharger turbine;
    a receptacle for compressed gas arranged to be in fluid communication with the exhaust manifold conduit;
    a gas compressor for compressing gas and configured to provide compressed gas to the receptacle;
    a valve arranged between the exhaust manifold conduit and the receptacle, the valve being configured to control a gas flow from the receptacle to the exhaust manifold conduit such that compressed gas from the receptacle may be provided to the exhaust manifold conduit during a predetermined pulse duration time period for initial spin-up of the turbocharger compressor;
    a cooling means configured to decrease temperature of the compressed gas provided by the gas compressor, wherein the cooling means is arranged between the gas compressor and the valve or at the gas compressor; and
    a heating means configured to increase temperature of the compressed gas before being provided to the exhaust manifold conduit, wherein the heating means is arranged between the valve and the inlet of the turbocharger turbine.

2. A system for a vehicle, the system comprising:
    an exhaust manifold; and
    the turbocharger system according to claim 1;
        wherein the exhaust manifold is in fluid communication with the exhaust manifold conduit and the receptacle, and wherein the valve and the receptacle are arranged to provide compressed gas to the exhaust manifold during the predetermined pulse duration time period for initial spin-up of the turbocharger compressor.

3. The turbocharger system according to claim 1 wherein the receptacle comprises a tank and at least one pipe, and wherein the tank and the at least one pipe are in direct fluid communication with each other.

4. The turbocharger system according to claim 3 wherein the cooling means comprises one pipe of the least one pipe of the receptacle, wherein the one pipe is arranged between the gas compressor and the tank of the receptacle, such that the compressed gas provided by the gas compressor is able to be cooled down before being provided to the tank.

5. The turbocharger system according to claim 4 wherein the cooling means is formed as a finned heat exchanger that comprises the one pipe of the receptacle, and the finned heat exchanger includes cooling flanges extending from the one pipe in a direction perpendicular to a direction of the one pipe.

6. The system according to claim 2 wherein the heating means is formed as a heat conductive conduit arranged such that at least a portion of the heat conductive conduit is guided along and in contact with a surface of the exhaust manifold or is formed as a heat conductive conduit arranged as at least one channel formed in the exhaust manifold, such that heat may be transferred from the exhaust manifold to the heat conductive conduit of the heating means.

7. The system according to claim 2 wherein the exhaust manifold is a dual sheet manifold, and wherein the heating means is provided by allowing the gas to flow through cavities of the dual sheet manifold.

8. The turbocharger system according to claim 3 wherein one pipe of the at least one pipe of the receptacle is arranged between the gas compressor and the tank of the receptacle, wherein the one pipe allows the gas compressor and the tank to be in fluid communication with each other, wherein the one pipe is provided at an inclined angle such that a first end of the one pipe is arranged to the gas compressor and is elevated in relation to an opposite second end of the one pipe, and wherein the second end of the one pipe is arranged to the tank such that condensate formed in the one pipe and/or the gas compressor is dischargeable to the tank.

9. The turbocharger system according to claim 3 wherein the receptacle further comprises a drainage pipe arranged at a low portion of the tank such that condensate formed in the tank is dischargeable from the tank.

10. The turbocharger system according to claim 1 wherein the valve is configured to have: an opening response time of 25 to 100 ms and a closing response time of 50 to 200 ms.

11. The turbocharger system according to claim 1 wherein the valve is configured to empty 90% of the receptacle within 500 ms.

12. The turbocharger system according to claim 1 wherein the receptacle comprises a tank and a pipe arranged to connect the gas compressor to the tank, wherein the gas compressor is set to be in fluid communication with the tank via the pipe, and the pipe has an inner diameter of 4 to 5 mm.

13. The turbocharger system according to claim 1 wherein the receptacle comprises a tank and a pipe extending from the tank to the valve, wherein a gas flow from the tank through the pipe is controllable by using the valve, and the pipe has an inner diameter of essentially 12 to 15 mm.

14. A vehicle comprising the turbocharger system according to claim 1.

15. The vehicle according to claim 14 further comprising a pneumatic chassis suspension and/or air pressure brake system, and wherein the gas compressor and the receptacle are part of the pneumatic chassis suspension and/or the air pressure brake system.

16. A vehicle comprising the system according to claim 2.

17. The vehicle according to claim 16 further comprising a pneumatic chassis suspension and/or air pressure brake system, and wherein the gas compressor and the receptacle are part of the pneumatic chassis suspension and/or the air pressure brake system.

* * * * *